(12) United States Patent
Kliesch et al.

(10) Patent No.: US 7,794,822 B2
(45) Date of Patent: *Sep. 14, 2010

(54) HYDROLYSIS-RESISTANT, MULTILAYER POLYESTER FILM WITH HYDROLYSIS STABILIZER

(75) Inventors: Holger Kliesch, Ginsheim-Gustavsburg (DE); Martin Jesberger, Mainz (DE); Bodo Kuhmann, Runkel (DE); Ingo Fischer, Heistenbach (DE); Dagmar Klein, Ockenheim (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/693,837

(22) Filed: Mar. 30, 2007

(65) Prior Publication Data
US 2007/0237972 A1  Oct. 11, 2007

(30) Foreign Application Priority Data
Apr. 6, 2006  (DE) .................. 10 2006 016 156

(51) Int. Cl.
*B32B 7/00* (2006.01)
*B32B 27/18* (2006.01)
*B32B 27/36* (2006.01)
*B32B 37/15* (2006.01)

(52) U.S. Cl. .................. 428/212; 428/323; 428/334; 428/335; 428/336; 428/402; 428/403; 428/480; 428/910

(58) Field of Classification Search ............... None
See application file for complete search history.

(56) References Cited

U.S. PATENT DOCUMENTS

| | | | |
|---|---|---|---|
| 3,657,191 A | 4/1972 | Titzmann et al. ............ 260/75 T |
| 3,673,157 A * | 6/1972 | Price et al. .................. 528/277 |
| 5,266,397 A * | 11/1993 | Ogawa et al. ............... 428/323 |
| 5,885,709 A | 3/1999 | Wick et al. ................. 428/364 |
| 6,414,236 B1 * | 7/2002 | Kataoka et al. ............. 136/251 |
| 6,649,247 B2 * | 11/2003 | Murschall et al. ........... 428/141 |
| 6,709,731 B2 * | 3/2004 | Murschall et al. ........... 428/141 |
| 6,730,406 B2 * | 5/2004 | Murschall et al. ........ 428/423.7 |
| 6,841,222 B2 * | 1/2005 | Murschall et al. ........... 428/141 |
| 6,855,758 B2 * | 2/2005 | Murschall et al. ........... 524/195 |
| 6,872,461 B2 * | 3/2005 | Murschall et al. ........... 428/480 |
| 6,881,470 B2 * | 4/2005 | Murschall et al. ........... 428/141 |
| 6,936,350 B2 * | 8/2005 | Murschall et al. ........... 428/480 |
| 7,138,176 B2 * | 11/2006 | Murschall et al. ........... 428/334 |
| 7,157,132 B2 * | 1/2007 | Murschall et al. ........... 428/141 |
| 7,229,697 B2 * | 6/2007 | Kliesch et al. .............. 428/480 |
| 7,241,507 B2 * | 7/2007 | Kliesch et al. .............. 428/480 |
| 2003/0171465 A1 * | 9/2003 | Kliesch et al. .............. 524/127 |
| 2004/0247916 A1 * | 12/2004 | MacDonald et al. ......... 428/523 |
| 2005/0163987 A1 * | 7/2005 | Kliesch et al. .............. 428/220 |
| 2005/0164022 A1 * | 7/2005 | Kliesch et al. ........... 428/474.4 |
| 2005/0173050 A1 * | 8/2005 | Peiffer et al. ........... 156/244.11 |
| 2005/0214526 A1 * | 9/2005 | Klein et al. ................. 428/328 |
| 2006/0008638 A1 * | 1/2006 | Kiehne et al. ............... 428/323 |
| 2006/0057408 A1 * | 3/2006 | Kliesch et al. .............. 428/480 |
| 2006/0057409 A1 * | 3/2006 | Kliesch et al. .............. 428/480 |
| 2007/0238816 A1 * | 10/2007 | Kliesch et al. .............. 524/114 |

FOREIGN PATENT DOCUMENTS

| | | |
|---|---|---|
| CH | 621 135 | 1/1981 |
| DE | 100 48 721 A1 | 4/2002 |
| DE | 103 04 341 A1 * | 8/2004 |
| DE | 103 49 168 A1 * | 6/2005 |
| EP | 0 292 251 A2 | 11/1988 |
| EP | 0 838 500 A2 | 4/1998 |
| EP | 1 634 914 A1 | 3/2006 |

* cited by examiner

*Primary Examiner*—Vivian Chen
(74) *Attorney, Agent, or Firm*—ProPat, L.L.C.

(57) ABSTRACT

The invention relates to a multilayer polyester film comprising a hydrolysis stabilizer, wherein the hydrolysis stabilizer is an epoxidized alkyl ester of fatty acid or is a mixture of epoxidized alkyl esters of fatty acid or is an epoxidized fatty acid glyceride or is a mixture of epoxidized fatty acid glycerides, and at least one external layer of the film does not comprise the hydrolysis stabilizer. The form in which the hydrolysis stabilizer is added to the polyester can be that of dry liquid, absorbed by a carrier material.

24 Claims, No Drawings

HYDROLYSIS-RESISTANT, MULTILAYER POLYESTER FILM WITH HYDROLYSIS STABILIZER

CROSS-REFERENCE TO RELATED APPLICATIONS

This application claims priority to German Patent Application 10 2006 016 156.4 filed Apr. 6, 2006 which is hereby incorporated herein by reference in its entirety.

FIELD OF THE INVENTION

The invention relates to a hydrolysis-resistant polyester film whose thickness is preferably in the range from 0.4 to 500 µm. The film comprises at least one hydrolysis stabilizer, and a feature of the film is its low hydrolysis rate. The film has at least two layers. The invention further relates to a process for the production of the film and to its use.

BACKGROUND OF THE INVENTION

Films comprised of polyesters in the stated thickness range are well known. A disadvantage of these polyester films, however, is their susceptibility to hydrolysis, in particular at temperatures above the glass transition temperature of the respective polyester. Susceptibility to hydrolysis here is the property of the polyester of becoming hydrolytically degraded under moist conditions, this being discernible by way of example from a reduction in the IV or SV value (viscosity). This is particularly a limiting factor for the use of polyester films in applications with relatively great exposure to high temperatures, for example in film capacitors, cable sheathing, ribbon cables, and engine-protection films, but also in long-term applications, for example in glazing and outdoor applications.

Susceptibility to hydrolysis is particularly pronounced with aliphatic polyesters, but also with aromatic polyesters, such as PBT and PET. If the susceptibility of PET to hydrolysis becomes too great for the application, it becomes necessary to resort to PEN, which is somewhat more hydrolysis-resistant, or even to other polymers, e.g. polyetherimides or polyimides. However, these are markedly more expensive than PET and therefore are frequently unsuitable for economic reasons.

For this reason, there have been previous proposals for improving the hydrolysis resistance of polyester films via incorporation of hydrolysis stabilizers.

Polyesters relatively resistant to hydrolysis, obtained via use of carbodiimides, are known (U.S. Pat. No. 5,885,709, EP-A-0 838 500, CH-A-621 135), as also are films and fibers produced therefrom. Films produced from these polymers tend, however, both during production and in later use, to evolve gases of isocyanates and of other by- and degradation products which are hazardous to health or irritant to mucous membrane. This problem is much more widespread with sheet-like structures, such as films, with large surface area, than with injection moldings or the like.

Hydrolysis stabilizers which have epoxy groups also give hydrolysis stabilization and are described by way of example in EP-A-0 292 251 A2 or U.S. Pat. No. 3,657,191. However, these compounds are based on the production of oxirane rings by means of epichlorohydrin and have a tendency inter alia caused by their terminal epoxy groups toward cleavage of low-molecular-weight toxic compounds on heating, the problems attendant on the use of these substances therefore being similar to those attendant on the use of carbodiimides. Furthermore, their incorporation into the polyester matrix is inadequate, and this leads to long reaction times and to high, undesired haze in the case of oriented polyester films.

Another disadvantage of known hydrolysis stabilizers, such as carbodiimide and other substances such as those described in EP-A-0 292 251 is that they sometimes lead to marked increases in molecular weight (viscosity rise) in the polymer during extrusion, thus making the extrusion process unstable and difficult to control.

DE 103 49 168 A1 describes mixtures comprised of epoxidized alkyl esters of fatty acid and of epoxidized fatty acid glycerides as hydrolysis stabilizers inter alia for industrial oils, vegetable esters, polyurethanes, and polyesters, the preferred embodiment of these comprising, as third component of the mixture, up to 30% by weight of a carbodiimide. There are no indications of appropriate incorporation of these hydrolysis stabilizers into a polyester film. However, when these additives are used in particular in outer layers of the film (in the case of a single-layer film this layer being the outer layer), the result is impairment of metallizability/printability, and odor problems can occur via evaporation of the stabilizer.

SUMMARY OF ADVANTAGEOUS EMBODIMENTS OF THE INVENTION

It was an object of the present invention to provide a hydrolysis-resistant polyester and films produced therefrom which avoid the disadvantages described in the prior art.

DETAILED DESCRIPTION OF ADVANTAGEOUS EMBODIMENTS OF THE INVENTION

This object is achieved via a polyester film which preferably comprises, alongside polyester, from 0.1-20% by weight (based on the weight of the finished film) of a hydrolysis stabilizer based on epoxidized alkyl esters of fatty acid and/or on epoxidized fatty acid glycerides.

This film has at least two layers and has at least one external layer which does not comprise the above-mentioned hydrolysis stabilizers.

The film comprises a polyester as main constituent. Examples of suitable polyesters are polyethylene terephthalate (PEP), polyethylene naphthalate (PEN), polybutylene terephthalate (PBT), polytrimethylene terephthalate (PTT), bibenzene-modified polyethylene terephthalate (PETBB), bibenzene-modified polybutylene terephthalate (PBTBB), bibenzene-modified polyethylene naphthalate (PENBB), or a mixture thereof, preference being given to PET, PBT, PEN, and PTT, and also to their mixtures and co-polyesters.

Examples of compounds that can be used for the preparation of the polyesters, alongside the main monomers, such as dimethyl terephthalate (DMT), ethylene glycol (EG), propylene glycol (PG), 1,4-butanediol, terephthalic acid (TA), benzenedicarboxylic acid, and/or 2,6-naphthalenedicarboxylic acid (NDA), are isophthalic acid (IPA), trans- and/or cis-1,4-cyclohexanedimethanol (c-CHDM, t-CHDM or c/t-CHDM) and other suitable dicarboxylic acid components (or dicarboxylic esters) and diol components. The present invention also encompasses corresponding copolyesters.

Preference is given to polymers in which 90% by weight (based on the entire amount of the dicarboxylic acid component) or more, in particular 95% by weight or more, of the dicarboxylic acid component is comprised of TA. Further preference is given to thermoplastics in which 90% by weight or more, in particular 93% by weight (based on the entire amount of the diols) or more, of the diol component is comprised of EG. Preference is also given to polymers in which the diethylene glycol content of the entire polymer is in the range from 0.5 to 2% by weight. The hydrolysis stabilizer is ignored in all of the quantitative data mentioned in this paragraph.

Other suitable polyesters are aliphatic polyesters, e.g. polyhydroxybutyrate (PHB) and its copolymers with polyhydroxyvalerate (PHV), polyhydroxybutyrate-valerate (PHBV), poly(e-caprolactone) (PCL), SP 3/6, SP 4/6 (comprised of 1,3-propanediol/adipate and, respectively, 1,4-butanediol/adipate), polycaprolactam, or generally adipic-acid-containing polyesters and the esters of other aliphatic carboxylic acids.

The film of the invention can moreover comprise inorganic or organic particles, these being needed to establish the surface topography or optical properties. Examples of these particles are calcium carbonate, apatite, silicon dioxide, titanium dioxide, aluminum oxide, crosslinked polystyrene, crosslinked polymethyl methacrylate (PMMA), zeolites, and other silicates, such as aluminum silicate. The amounts generally used of these compounds are from 0.05 to 5% by weight, preferably from 0.1 to 0.6% by weight (based on the weight of the film).

The film can also comprise further components alongside the additives mentioned, examples being flame retardants and/or free-radical scavengers, and/or other polymers, such as polyetherimides.

The inventive film comprises a hydrolysis stabilizer, the content of the hydrolysis stabilizer preferably being in the range from 0.1 to 20.0% by weight, with preference from 1.0 to 6.0% by weight, and particularly preferably from 1.5 to 4.5% by weight, based on the weight of the film. Epoxidized alkyl esters of fatty acid and/or epoxidized fatty acid glycerides are suitable hydrolysis stabilizers. Mixtures of glycerol esters (fatty acid glycerides) are suitable hydrolysis stabilizers, as also are pure glycerol esters, the glycerol esters here being described by the following formula:

where $R_1$ and $R_2$ and $R_3$ can be either identical or different. $R_1$, $R_2$, and $R_3$ preferably comply with the following formula:

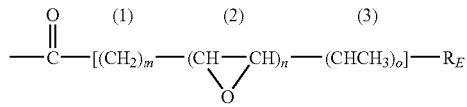

where $R_E$=CH$_3$ or H, and m=0-40, preferably 7-20, particularly preferably 10-16, n=1-10, preferably 1-4, particularly preferably 2-3, and O=0-4, preferably 0.

The sequence of the individual methylene (CH$_2$)-(1), epoxy (CHOCH)-(2), and (CHCH$_3$)-(3) groups here is as desired, and it is preferable here that at least two methylene groups (1) and particularly preferably 7 methylene groups (1) follow the carbonyl group before one or more of the groups (2) or (3) and again (1) follow. The indices therefore give merely the entire number (not the sequence) of the groups present (1), (2), or (3) in the radicals $R_1$, $R_2$, and $R_3$.

In glycerol ester mixtures here, the amount that should be present of radicals $R_{1,2,3}$ where m=0 should be less than 30% by weight and preferably less than 20% by weight and particularly preferably less than 10% by weight (based on the weight of the ester mixture).

One or more of the radicals $R_1$ and $R_2$ and $R_3$ here can also be:

R=unsaturated fatty acid (double-bonded, not completely epoxidized)

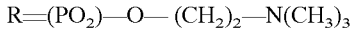

these glycerol esters being less preferred, and the amount of glycerol esters containing these radicals in the glycerol ester mixtures should preferably be less than 20% by weight and particularly preferably less than 5% by weight.

Since the glycerol esters or glycerol ester mixtures used are preferably epoxidized oils of biogenic origin, these mostly also comprise small amounts of other substances (proteins, etc.), alongside the glycerol esters. The content of these substances is preferably below 10% by weight and particularly preferably below 2% by weight, based on the weight of the epoxide oil used.

In particular, the content of compounds whose boiling point is below 210° C. is preferably less than 5% by weight and particularly preferably less than 1% by weight.

The acid number of the hydrolysis stabilizers used is preferably below 10 mg KOH per gram, and particularly preferably below 2 mg KOH per gram (DIN EN ISO 3682).

For the incorporation, and for the effectiveness, of the hydrolysis stabilization, it has proven advantageous for the viscosity of the stabilizers used to be greater than 300 mPa·s, preferably greater than 500 mPa·s, and particularly preferably greater than 700 mPa·s, at 25° C. (DIN 53018).

Particularly suitable hydrolysis stabilizers are those which have an epoxide oxygen content of at least 0.5% by weight, preferably at least 1.5% by weight, and particularly preferably greater than 2.0% by weight.

Examples of suitable epoxidized fatty acid glycerides and their mixtures are epoxidized soybean oil, epoxidized linseed oil, epoxidized rapeseed oil, epoxidized sunflower oil, and epoxidized fish oil, or are present in these epoxidized oils (the composition of the oils mentioned, in particular the nature and amount of the fatty acids present, being described by way of example in Römpp Chemie Lexikon [Römpp's Chemical Encyclopedia], 10th edition, Georg Thieme Verlag, Stuttgart).

The epoxidized alkyl esters of fatty acids used can in principle comprise esters of saturated, of unsaturated, or of polyunsaturated fatty acids, these preferably having from 1.5-15% by weight of the epoxide oxygen (based on the epoxidized ester). Alkyl here means straight-chain or branched alkyl radicals preferably having from 1 to 20 carbon atoms. The fatty acids preferably comprise those which correspond to the definitions of $R_1$—$R_3$ mentioned for the fatty acid glycerides.

The inventive hydrolysis stabilizers (epoxidized alkyl esters of fatty acid and/or epoxidized fatty acid glycerides) are preferably used separately, i.e. either epoxidized alkyl esters of fatty acid or a mixture of these or epoxidized fatty acid glycerides or a mixture of these. However, it is also possible to use mixtures of esters and of glycerides. In each of these cases, it is preferable that the hydrolysis stabilizers are used in the form of a "dry liquid", as described in further detail. Particular preference is given here to the use of epoxidized fatty acid glycerides in the form of epoxidized oils of biogenic origin. The inventive hydrolysis stabilizers or the oils comprising them are known and commercially available (cf., for example, the products of the inventive examples).

Preferred epoxidized alkyl esters of fatty acids used are the thermally stable 2-ethylhexyl esters of unsaturated fatty acids or fatty acid mixtures of rapeseed-oil fatty acids, of linseed-oil fatty acids, of soybean-oil fatty acids, or of fish-oil fatty acids, the epoxy contents of these preferably being 1.5 to 15% by weight of epoxide oxygen (based on the epoxidized alkyl esters of fatty acid), preferably from 4 to 8% by weight.

It has moreover proven advantageous for the film to receive addition of a stabilizer in the form of a free-radical scavenger, since this counteracts the loss of active oxirane groups in extrusion via free-radical side reactions. The inventive film advantageously comprises amounts of from 50 to 15 000 ppm, preferably from 100 to 5000 ppm, particularly preferably from 300 to 1000 ppm, based on the weight of the film, of these stabilizers in the form of free-radical scavengers or heat stabilizers. The stabilizers added to the polyester are selected as desired for example from the group of the primary stabilizers, such as sterically hindered phenols or secondary aromatic amines, or from the group of the secondary stabilizers, such as thioethers, phosphites, and phosphonites, and also zinc dibutyldithiocarbamate, or a mixture comprised of primary and secondary stabilizers. Preference is given to the phenolic stabilizers. Among the phenolic stabilizers are in particular sterically hindered phenols, thiobisphenols, alkylidenebisphenols, alkylphenols, hydroxybenzyl compounds, acylaminophenols, and hydroxyphenylpropionates (appropriate compounds being described by way of example in "Kunststoffadditive" [Plastics additives], 2nd edition, Gächter Müller, Carl Hanser-Verlag, and in "Plastics Additives Handbook", 5th edition, Dr. Hans Zweifel, Carl Hanser Verlag). The stabilizers with the following CAS numbers: 6683-19-8, 36443-68-2, 35074-77-2, 65140-91-2, 23128-74-7, 41484-35-9, 2082-79-3 are particularly preferred, as also are IRGANOX® 1222 from Ciba Specialties, Basle, Switzerland, and in particular embodiments here the grades used comprise IRGANOX® 1010, IRGANOX® 1222, IRGANOX® 1330, and IRGANOX® 1425, or a mixture of these.

Surprisingly, it has proven more advantageous for the free-radical scavenger to be added not to the hydrolysis stabilizer but to the polyester, before the polymer preparation process has been completed.

The hydrolysis stabilizer can take the form of a masterbatch when added to the film, and to this end a polyester is melted in an extruder and the hydrolysis stabilizer is fed into the extruder, and the mixture is extruded through a pelletizing die, cooled, and then pelletized. The content of hydrolysis stabilizer in the masterbatch is usually from 2 to 40% by weight. Addition by way of a masterbatch is a less preferred method, since the hydrolysis stabilizer here is first extruded together with the polyester during preparation of the masterbatch and has to be extruded again for film production. In both extrusion steps, the hydrolysis stabilizer loses effectiveness. It has therefore proven advantageous for the hydrolysis stabilizer to be fed directly into the extruder during film extrusion.

The material used here can either take the form of the pure hydrolysis stabilizer or else preferably take the form of a "dry liquid". "Dry liquid" means that most of the stabilizer (at least 50%), preferably more than 75%, has been absorbed by a carrier material. Suitable carrier materials are inter alia silicates, preferably synthetic silica, such as Sipernat 22LS (Degussa) or Hi-Sil ABS (PPG Industries), diatomaceous silicates, calcium silicates, zeolites, aluminum phosphates, polymeric molecular sieves, or carbon molecular sieves. The median grain size $d_{50}$ of the particles here is preferably below 300 µm, in particular below 150 µm, and particularly preferably below 50 µm. Oil absorption (DBP, according to DIN 53601) is greater than 20 g/100 g, preferably greater than 100 g/100 g, in particular preferably greater than 200 g/100 g, based in each case on the dry substance. The carrier material is introduced into the hydrolysis stabilizer by means of a stirrer.

The hydrolysis stabilizer [i.e. here the carrier material with absorbed hydrolysis stabilizer (=dry liquid)] and also any remaining free hydrolysis stabilizer alongside this is preferably introduced directly into the extruder(s) during film production. Good hydrolysis stabilization results are achieved using carrier material even on introduction into single-screw extruders and with feed directly into the extruder intake, unlike with the feed of hydrolysis stabilizer without carrier material. The hydrolysis stabilizer (on carrier material) can also be introduced by way of masterbatch technology. This means that the hydrolysis stabilizer (with carrier material) is introduced in an extruder (preferably a multiscrew extruder) into an inventive polymer. During film production, this polymer is then mixed in pure form or with other inventive polymers and again extruded. However, this process is less preferred, since hydrolysis stabilizer is consumed (consumed by reaction) before the first extrusion step is complete and is then no longer available as active substance in the film. When a "dry liquid" is used, the film preferably comprises, alongside the hydrolysis stabilizer, at least 0.1% by weight, in particular at least 0.5% by weight, and particularly preferably at least 1% by weight, of carrier material.

The film of the invention is generally produced by extrusion processes known per se and is a multilayer film, in particular at least a two-layer film, preferably a three-layer film, the hydrolysis stabilizer being absent in at least one external layer. In one particularly preferred embodiment, neither of the external layers of the film has any hydrolysis stabilizer.

The outer layer(s) comprising no hydrolysis stabilizer are preferably designed with minimum thickness. This means that each of these layers is preferably thinner than 5 µm and particularly preferably thinner than 1 µm, and ideally thinner than 0.6 µm. However, it has proven advantageous for the layer not to be thinner than 0.1 µm.

The polymers and additives (except the hydrolysis stabilizers described) present in the layers free from hydrolysis stabilizer can in principle be the same as those present in the layer(s) comprising the hydrolysis stabilizer.

However, it has proven advantageous for the polyester to have minimum content of carboxy end groups. Polymers of this type are described inter alia in EP-A-0 738 749. In one preferred embodiment, the carboxy content expressed in mmolH+/kg of polymer is smaller than 25 and particularly preferably smaller than 15 mmolH+/kg of polymer. Values of this type are achieved via solid-phase condensation. For this, the polyester is first polycondensed to an IV value (intrinsic viscosity in trichloroethane/phenol, as described in U.S. Pat. No. 3,432,591) of 0.52-0.58. The polymer is then crystallized (0.01-2 hours at 150-170° C.), and then dried at a pressure smaller than 1 mbar for 1-5 hours at 160° C. The actual solid-phase condensation is then carried out for 5-20 hours at 210-230° C. at a pressure <1 mbar, and finally the material is cooled within a period of 1-4 hours under dry nitrogen. The target viscosity here is an IV of from 0.61 to 0.72. Higher IV values, as described, for example, in EP 0738749, have proven rather disadvantageous in practice, since the high viscosities require higher temperatures or higher shear rates in the extruder and thus increase the susceptibility of the melt to hydrolysis. The IV values of the polymers used in the layer(s) with hydrolysis stabilizer should likewise preferably be 0.61-0.72. In particular, it has proven advantageous for the difference in the IV values of the stabilizer-containing layer (in the case of layers, the average value) and the IV values of the layer without hydrolysis stabilizer (in the case of layers, the average value) to be no greater than 0.1 and preferably no greater than 0.03.

The procedure in the process for production of the inventive films is advantageously that the corresponding melts are extruded through a flat-film die, the resultant film is drawn off and quenched for solidification on one or more rolls (chill roll) in the form of a substantially amorphous preform, the film is then heated again and biaxially stretched (oriented), and the biaxially stretched film is heat-set. In the region of the extrusion process here, it has proven advantageous to avoid exceeding temperatures of 295° C. It is particularly advantageous for the region of the die and specifically the region of the die lip and its vicinity to be no hotter than 290° C., preferably no hotter than 285° C., and particularly preferably no hotter than 275° C.

It has proven advantageous for the temperature of the extruders which extrude thin outer layers without hydrolysis stabilizer to have been set higher by at least 1° C. and preferably by 3-7° C. than the temperature of the extruders which extrude the layers comprising hydrolysis stabilizer.

The biaxial orientation is generally carried out sequentially. Here, it is preferable to orient first longitudinally (i.e. in machine direction=MD) and then to orient transversely (i.e. perpendicularly to machine direction=TD). This leads to orientation of the molecular chains. Longitudinal orientation can be carried out with the aid of two rolls running at different speeds corresponding to the desired stretching ratio. For transverse orientation, an appropriate tenter frame is generally used.

The temperature at which the orientation is carried out can vary relatively widely and depends on the desired properties of the film. Longitudinal stretching, and also transverse stretching, is generally carried out at $T_g+10°$ C. to $T_g+60°$ C. ($T_g$=glass transition temperature of the film). The longitudinal stretching ratio is generally in the range from 2:1 to 6:1, preferably from 3:1 to 4.5:1. The transverse stretching ratio is generally in the range from 2:1 to 5:1, preferably from 3:1 to 4.5:1, and the ratio for any second longitudinal and transverse stretching carried out is preferably 1.1:1 to 5:1.

The first longitudinal stretching can, if appropriate, be carried out simultaneously with the transverse stretching (simultaneous stretching). It has proven particularly advantageous here for the longitudinal and transverse stretching ratio in each case to be greater than 3.

In the heat-setting which follows, the film is kept for from 0.1 to 10 s at a temperature of from about 150 to 260° C., preferably from 200 to 245° C. Following the heat-setting, or beginning therewith, the film is preferably relaxed in order to reduce shrinkage values, preferably by from 0 to 15%, in particular by from 1.5 to 8%, transversely and, if appropriate, also longitudinally, and the film is then conventionally cooled and wound up. In order to achieve particularly low shrinkage values, maximum setting temperatures of from 230 to 240° C. and relaxations above 5% are particularly advantageous.

A film produced in this manner has markedly lower susceptibility to hydrolysis, not only at room temperature but also at temperatures up to 210° C., when compared with an unmodified polyester film. The stabilization here is substantially independent of the thickness of the film and of the temperature in the test range, from 25 to 210° C. For example, a three-layer PET film of thickness 50 µm (DEG content 1%, initial SV value 750) with two outer layers comprised of PET of thickness 0.7 µm (carboxy end group content in mmolH+/kg=11) and with a base layer comprised of. PET with 2.5% by weight of a hydrolysis stabilizer comprised of epoxidized soybean oil having epoxide oxygen content of 8% by weight (absorbed on Hi-Sil ABS from PPG Industries) retains an SV value above 600 after 96 h in an autoclave with water vapor saturation at 110° C. and with this retains mechanical stability, while the SV value of unstabilized film has after this time fallen as low as below 400, and with this the film has lost almost all its resistance to flexural fracture. A two-layer PET film of thickness 50 µm (DEG content 1%, initial SV value 750) with an outer layer thickness 0.7 µm comprised of PET (carboxy end group content in mmolH+/kg=11) and with a base layer comprised of PET with 2.5% by weight of a hydrolysis stabilizer comprised of epoxidized soybean oil with epoxide oxygen content of 8% by weight (absorbed on Hi-Sil ABS from PPG Industries) retains an SV value above 600 after 96 h in an autoclave with water vapor saturation at 110° C. The stabilized films withstand the conditions mentioned for 200% longer prior to reaching the critical limit of 400 SV units. The same relative time improvement is also found at 80° C. and at 170° C.

It was particularly surprising that, despite the good long-term hydrolysis resistance, no undesired viscosity increase occurred in the extruder during film production, and no increase in the level of gelling or fish-eyes was observed. Another surprise was the marked improvement in hydrolysis stabilization via use of a carrier material. (Use in the form of dry liquid).

In comparison with a single-layer film with the same thickness and stabilizer content, the abovementioned two-layer film gave a marked reduction in the cooking-fat odor which sometimes arises during the production process, due to the hydrolysis stabilizer. The odor could be almost entirely eliminated using the abovementioned three-layer film.

The two-layer film has good metallizability and printability on the side with the unstabilized outer layer. On the side with the hydrolysis stabilizer, it is easier to remove metal layer and printing inks by wiping (removal by wiping with a dry paper tissue). The three-layer film had good metallizability and printability on both sides.

Films stabilized by means of the hydrolysis stabilizers mentioned have excellent suitability for production of products which comprise polyester films and which have been designed for long lifetime (greater than 1 year) or which have to withstand relatively high temperatures (greater than 80° C.) during their use, in particular in very moist conditions, and for outdoor applications.

They therefore have excellent suitability for production of film capacitors (preferred thickness range 0.4-12 µm). These can be produced by the known conventional routes and process sequences (inter alia metallization, finishing, winding, schooping, contacting, potting, etc.) and in comparison with conventional polyester film capacitors have markedly increased lifetime and in comparison with capacitors previously described using carbodiimide stabilizers do not lead to emission of isocyanates hazardous to health, even when subjected to severe heating. For production of capacitors, it has proven advantageous for the longitudinal shrinkage of the films to be less than 4% and their transverse shrinkage to be less than 1% at 200° C., since they then have particularly good suitability for production of SMD capacitors. The inventive films preferably have these low shrinkage values.

An example of another application is ribbon cables in automobiles. For this, films (preferably 12-200 μm) are laminated to copper by means of a hot-sealable adhesive (e.g. EKP 230 hot-sealable lacquer from EKP Verpackungslacke GmbH (Germany)). Composites which comprise polyesters with the inventive hydrolysis stabilizers with stand the mechanical loads (inter alia vibrations) occurring in automobiles here for much longer than composites with conventional polyester films. However, care has to be taken here that the adhesives, too, are substantially resistant to hydrolysis (modification with the hydrolysis stabilizers mentioned being advisable in the case of polyester-based adhesives).

Another preferred application is reverse-side laminate of solar modules.

In the inventive examples which follow, each of the properties was measured in accordance with the stated standards or methods.

Test Methods

DIN=Deutsches Institut für Normung [German Institute for Standardization]

Standard Viscosity (SV)

Standard viscosity SV is measured—by a method based on DIN 53726—via measurement of the relative viscosity $\eta_{rel.}$ of a 1% strength by weight solution in dichloroacetic acid (DCA) in an Ubbelohde viscometer at 25° C. The SV value is defined as follows:

$$SV=(\eta_{rel.}-)\cdot 1000$$

Roughness

Roughness $R_a$ of the film is determined to DIN 4768 with a cut-off of 0.25 mm.

Shrinkage

Heat shrinkage is determined on square film samples whose edge length is 10 cm. The specimens are cut out in such a way that one edge runs parallel to the machine direction and one edge runs perpendicular to the machine direction. The specimens are measured precisely (edge length $L_0$ being determined for each machine direction TD and MD, $L_{0TD}$ and $L_{0MD}$) and are heat-conditioned for 15 min at the stated shrinkage temperature (here 200° C.) in a drying cabinet with air circulation. The specimens are removed and measured precisely at room temperature (edge length $L_{TD}$ and $L_{MD}$). Shrinkage is calculated from the following equation:

$$\text{Shrinkage}[\%]MD=100\cdot(L_{0MD}-L_{MD})/L_{0MD}$$

$$\text{Shrinkage}[\%]TD=100\cdot(L_{0TD}-L_{TD})/L_{0TD}$$

Autoclaving

The films (10.2 cm) are suspended in the autoclave (Adolf Wolf SANOklav ST-MCS-204) on a wire and 2 l of water are charged to the autoclave. The autoclave is closed and then heated. At 100° C., the air is displaced by water vapor by way of the outlet valve. This is closed after about 5 min, whereupon the temperature rises to 110° C. and the pressure rises to 1.5 bar. After the set time, the autoclave is automatically switched off and the films are removed after opening of the outlet valve. These are then used for determination of SV value.

Odor

Odor 6 meters from the die (longitudinal stretching direction) was subjectively classified into three categories:

2=strong

1=detectable

0=no odor

Five people were asked for an opinion and the category mentioned most often was taken as the result. All of the people had been present at least once during production of single-layer film with hydrolysis stabilizer and therefore knew the odor.

EXAMPLES

Hydrolysis Stabilizer 1 (Hystab 1)

2 parts (parts by weight) of epoxidized soybean oil (MERGINAT ESB from HOBUM Oleochemicals GmbH, Germany) with epoxide oxygen content of 8% by weight are mixed with one part of HI-SIL ABS from PPG Industries USA.

Hydrolysis Stabilizer 2 (Hystab 2)

POLYBIO HYSTAB 10 from Schäfer Additvsysteme GmbH. Natural epoxidized fatty acid ester.

| | |
|---|---|
| Polymer P1 | PET (RT49, Invista Deutschland), SV value 790 |
| Masterbatch MB1 | 1.0% by weight of SYLOBLOC 44H, 0.5% by weight of AEROSIL TT600, and 98.2% by weight of PET; SV value 790; DEG content of 1% by weight, and also 3000 ppm of IRGANOX 1010 (Ciba; addition of IRGANOX during polyester polymerization) |
| Polymer P2 | PET with carboxy group content of 11 (carboxy group content in mmolH+/kg). For this, PET with IV of 0.58 was prepared by the transesterification process (transesterification catalyst: manganese acetate, 35 ppm of Mn, stabilizer phosphorous acid, 70 ppm of P, polycondensation catalyst antimony trioxide, 200 ppm of Sb). The polymer was then crystallized (10 minutes at 160° C. in a fluidized-bed dryer), and then dried for 3 hours at 160° C. at a pressure of 0.7 mbar. Solid-phase condensation was then carried out for 10 hours at 222° C. at a pressure of 0.31 mbar, and the material was then cooled within a period of 2 hours under dry nitrogen. The IV value of the polymer was 0.62 (SV = 810) |

Film Production:

Thermoplastic chips (MB1, and also P1, P2) were mixed in the ratios stated in the examples and extruded at 280° C. (outer layer without stabilizer 285° C.), in twin-screw extruders (Japan Steel Works). The hydrolysis stabilizers (Hystab 1-2) were fed in the case of Hystab 1 by way of a vibratory chute directly into the extruder intake. Hystab 2 was fed by means of a pump into the melt after devolatilization. The molten polymer was drawn off from a die (temperature 274° C.) by way of a take-off roll. The thickness of this prefilm was 533 μm. The film was stretched by a factor of 3.4 in machine direction at 116° C. and transverse stretching by a factor of 3.1 was carried out at 110° C. in a frame. The film was then heat-set at 231° C. and relaxed transversely by 6% at temperatures of from 200 to 180° C. The final film thickness was 50 μm.

The properties of the films produced are found in the table below.

TABLE

|  | Unit | Example 1 | Example 2 | Example 3 | Example 4 | Example 5 | Comparative example |
|---|---|---|---|---|---|---|---|
| Layer 1 (external) | in % by wt. | P1 = 94.25 | P2 = 98 | P2 = 98 | P1 = 98 | P2 = 98 | P2 = 98 |
|  | in % by wt. | MB1 = 2 | MB1 = 2 | MB1 = 2 | MB1 = 2 | MB1 = 2 | MB1 = 2 |
|  | in % by wt. | Hystab1 = 3.75 | — | — | — | — | — |
| Layer 2 (internal in the case of 3 layers; external in the case of 2 layers) | in % by wt. | P1 = 96.25 | P1 = 86.25 | P1 = 96.25 | P1 = 96.25 | P1 = 97.5 | P1 = 100 |
|  | in % by wt. | Hystab1 = 3.75 | MB1 = 10 | Hystab1 = 3.75 | Hystab1 = 3.75 | Hystab2 = 2.5 | — |
|  | in % by wt. | — | Hystab1 = 3.75 | — | — | — | — |
| Layer 3 (external) | in % by wt. | P1 = 94.25 | — | P2 = 98 | P1 = 98 | P2 = 98 | P2 = 98 |
|  | in % by wt. | MB1 = 2 | — | MB1 = 2 | MB1 = 2 | MB1 = 2 | MB1 = 2 |
|  | in % by wt. | Hystab1 = 3.75 | — | — | — | — | — |
| Film thickness (layer thickness 1/2/3) | in μm | 50 (0.7/48.6/0.7) | 50 (0.7/49.3/—) | 50 (0.7/48.6/0.7) | 50 (0.7/48.6/0.7) | 50 (0.7/48.6/0.7) | 50 (0.7/48.6/0.7) |
| SV value (after film production) |  | 767 | 773 | 771 | 777 | 769 | 760 |
| SV value after 96 h at 110° C. in autoclave with water saturation |  | 620 | 607 | 600 | 575 | 590 | 395 |
| Odor | category | 2 | 1 | 0 | 0 | 0 | 0 |

The invention claimed is:

1. A multilayer polyester film comprising a hydrolysis stabilizer, wherein the hydrolysis stabilizer is an epoxidized alkyl ester of fatty acid or is a mixture of epoxidized alkyl esters of fatty acid or is an epoxidized fatty acid glyceride or is a mixture of epoxidized fatty acid glycerides, said film further comprising at least one external layer and at least one of said external layers does not comprise the hydrolysis stabilizer,
    wherein the resulting film has an SV loss after autoclaving which is higher than said hydrolysis-stabilized film including said hydrolysis stabilizer within said external layer(s) up to a loss of 202 SV units after 96 hours at 110° C. in an autoclave with water saturation.

2. The polyester film as claimed in claim 1, wherein the hydrolysis stabilizer is added to the polyester in the form of a dry liquid.

3. The polyester film as claimed in claim 1, said film comprising a hydrolysis stabilizer, wherein the hydrolysis stabilizer is comprised of at least one of (i) one or more epoxidized alkyl esters of fatty acid and (ii) one or more epoxidized fatty acid glycerides, and is added to the polyester in the form of a dry liquid, said dry liquid comprising at least 50% of said hydrolysis stabilizer absorbed by a carrier material having an oil absorption, according to DIN 53601, of greater than 20 g/100 g.

4. A multilayer polyester film as claimed in claim 3, wherein said carrier material comprises silicate, zeolite, aluminum phosphate, polymeric molecular sieve or carbon molecular sieve.

5. The polyester film as claimed in claim 1, which comprises from 0.1 to 20% by weight of hydrolysis stabilizer.

6. The polyester film as claimed in claim 1, wherein the epoxide oxygen content of the hydrolysis stabilizer is at least 0.5% by weight.

7. The polyester film as claimed in claim 1, wherein the epoxidized fatty acid glycerides comprise epoxidized soybean oil, epoxidized linseed oil, epoxidized rapeseed oil, epoxidized sunflower oil, or epoxidized fish oil, or a mixture of these.

8. The polyester film as claimed in claim 1, wherein the epoxidized alkyl esters of fatty acid comprise the 2-ethylhexyl esters of the unsaturated fatty acids or fatty acid mixtures derived from rapeseed oil, linseed oil, soybean oil, or fish oil.

9. The polyester film as claimed in claim 1, wherein the epoxide oxygen content of the epoxidized alkyl esters of fatty acid is from 1.5 to 15% by weight.

10. The polyester film as claimed in claim 1, which comprises a free-radical scavenger.

11. The polyester film as claimed in claim 1, which comprises at least 0.1% by weight of carrier material derived from the addition of the hydrolysis stabilizer in the form of a dry liquid.

12. The polyester film as claimed in claim 11, wherein the carrier material is a silicate.

13. The polyester film as claimed in claim 11, wherein the carrier material comprises synthetic silica.

14. The polyester film as claimed in claim 1, which comprises, as polyester, polyethylene terephthalate, polybutylene terephthalate, polyethylene naphthalate, or polytrimethylene terephthalate, or a mixture of these, or copolyesters of these.

15. The polyester film as claimed in claim 1, wherein said film further comprises inorganic or organic particles.

16. The polyester film as claimed in claim 1, wherein said film is a three-layer film.

17. The polyester film as claimed in claim 1, wherein no external layers of said film comprises the hydrolysis stabilizer.

18. A process for production of a polyester film as claimed in claim 1, said process comprising the steps of:
    a) producing a multilayer film via coextrusion,
    b) biaxial stretching of the film, and
    c) heat-setting of the stretched film.

19. Solar modules comprising multilayer polyester film as claimed in claim 1, said film comprising a hydrolysis stabilizer, wherein the hydrolysis stabilizer is an epoxidized alkyl ester of fatty acid or is a mixture of epoxidized alkyl esters of fatty acid or is an epoxidized fatty acid glyceride or is a mixture of epoxidized fatty acid glycerides, said film further comprising at least one external layer and at least one of said external layers does not comprise the hydrolysis stabilizer.

20. The polyester film as claimed in claim 1, wherein said hydrolysis stabilizer-free external layer(s) has a thickness ranging from 0.1 to less than 1 micron.

21. The polyester film as claimed in claim 1, wherein the hydrolysis stabilizer-free external layer(s) further comprise free radical scavenger.

22. A multilayer polyester film as claimed in claim 1, said film comprising a hydrolysis stabilizer, wherein the hydrolysis stabilizer is an epoxidized alkyl ester of fatty acid or is a mixture of epoxidized alkyl esters of fatty acid or is an epoxidized fatty acid glyceride or is a mixture of epoxidized fatty acid glycerides, said film further comprising at least one external layer and at least one of said external layers does not comprise the hydrolysis stabilizer, said hydrolysis-stabilizer-free outer layer ranging in thickness from 0.1 microns to less than 5 microns.

23. A multilayer polyester film as claimed in claim 1, said film comprising a hydrolysis stabilizer, wherein the hydrolysis stabilizer is an epoxidized alkyl ester of fatty acid or is a mixture of epoxidized alkyl esters of fatty acid or is an epoxidized fatty acid glyceride or is a mixture of epoxidized fatty acid glycerides, said film further comprising at least one external layer and at least one of said external layers does not comprise the hydrolysis stabilizer, said film exhibiting a longitudinal shrinkage of less than 4% and transverse shrinkage of less than 1% at 200° C.

24. A multilayer polyester film comprising from 0.1 to 20% by weight of a hydrolysis stabilizer, said hydrolysis stabilizer comprising an epoxidized alkyl ester of fatty acid or a mixture of epoxidized alkyl esters of fatty acid or an epoxidized fatty acid glyceride or a mixture of epoxidized fatty acid glycerides, said film further comprising at least one external layer and at least one of said external layers is a hydrolysis-stabilizer-free external layer having a thickness ranging from 0.1 to less than 5 microns, wherein the resulting film has an SV loss after autoclaving which is higher than said hydrolysis-stabilized film including said hydrolysis stabilizer within said external layer(s) up to a loss of 26.0% of the film's initial SV, wherein said autoclaving is performed for 96 hours at 110° C. with water saturation.

* * * * *